US012741444B2

(12) United States Patent
Miks et al.

(10) Patent No.: US 12,741,444 B2
(45) Date of Patent: Sep. 22, 2026

(54) MULTI-FUNCTIONAL ACOUSTICAL FOAM BOARD

(71) Applicant: JOHNS MANVILLE, Denver, CO (US)

(72) Inventors: Kathryn Fink Miks, Littleton, CO (US); Mark H Hartmann, Superior, CO (US); Matthew George Girolmo, Lakewood, CO (US); Francis John Babineau, Jr., Parker, CO (US)

(73) Assignee: Johns Manville, Denver, CO (US)

( * ) Notice: Subject to any disclaimer, the term of this patent is extended or adjusted under 35 U.S.C. 154(b) by 223 days.

(21) Appl. No.: 18/536,889

(22) Filed: Dec. 12, 2023

(65) Prior Publication Data

US 2025/0187301 A1 Jun. 12, 2025

(51) Int. Cl.

| | |
|---|---|
| ***B32B 5/32*** | (2006.01) |
| ***B32B 3/26*** | (2006.01) |
| ***B32B 5/18*** | (2006.01) |
| ***B32B 7/02*** | (2019.01) |
| ***B32B 7/04*** | (2019.01) |
| ***B32B 37/16*** | (2006.01) |
| ***E04B 1/84*** | (2006.01) |
| ***E04B 1/86*** | (2006.01) |

(52) U.S. Cl.

CPC ................ *B32B 5/32* (2013.01); *B32B 3/266* (2013.01); *B32B 5/18* (2013.01); *B32B 7/02* (2013.01); *B32B 7/04* (2013.01); *B32B 37/16* (2013.01); *E04B 1/86* (2013.01); *B32B 2266/06* (2013.01); *B32B 2266/08* (2013.01); *B32B 2305/022* (2013.01); *B32B 2307/102* (2013.01); *B32B 2307/72* (2013.01); *B32B 2607/00* (2013.01); *E04B 2001/8461* (2013.01)

(58) Field of Classification Search

CPC ......... B32B 5/18; B32B 27/065; B32B 27/40; B32B 2266/0242; B32B 2307/102; B32B 2307/732; B32B 2605/18; G10K 11/168; B64D 29/00; B64C 1/40

See application file for complete search history.

(56) References Cited

U.S. PATENT DOCUMENTS

| | | | | |
|---|---|---|---|---|
| 4,042,746 A * | 8/1977 | Hofer | B29C 70/34 428/218 |
| 4,741,945 A * | 5/1988 | Brant | B60R 13/02 296/214 |
| 5,518,806 A * | 5/1996 | Eder | E04B 1/86 428/218 |
| 5,834,711 A * | 11/1998 | Haines | E04B 1/86 181/290 |
| 6,106,946 A | 8/2000 | Tanaka et al. | |
| 7,263,028 B2 | 8/2007 | Thomas et al. | |

(Continued)

FOREIGN PATENT DOCUMENTS

| | | | |
|---|---|---|---|
| EP | 0592837 A2 * | 4/1994 | C04B 41/70 |
| JP | 2020034859 A * | 3/2020 | |

*Primary Examiner* — Jeremy A Luks

(74) *Attorney, Agent, or Firm* — Robert D. Touslee

(57) ABSTRACT

An insulation component, comprising a first foam layer having a first density and a second foam layer coupled to the first foam layer. The second foam layer has a second density less than the first density. The first and second foam layers comprise a similar material. The insulation component includes an average sound absorption coefficient between 0.1 and 0.4.

20 Claims, 4 Drawing Sheets

(56) References Cited

U.S. PATENT DOCUMENTS

| | | | | |
|---|---|---|---|---|
| 8,631,899 | B2 * | 1/2014 | Zickmantel | G10K 11/168 181/290 |
| 9,390,702 | B2 | 7/2016 | Mathur | |
| 10,254,424 | B1 | 4/2019 | Pollock et al. | |
| 10,978,037 | B2 | 4/2021 | Mondain-Monval et al. | |
| 2004/0168853 | A1 | 9/2004 | Gunasekera et al. | |
| 2005/0126848 | A1 * | 6/2005 | Siavoshai | B60R 13/0815 181/290 |
| 2006/0021823 | A1 * | 2/2006 | Kohara | B32B 5/32 181/290 |
| 2017/0129145 | A1 * | 5/2017 | Wang | B29C 44/128 |
| 2017/0291681 | A1 | 10/2017 | Butts et al. | |
| 2020/0353716 | A1 * | 11/2020 | Vairo | B32B 5/32 |

* cited by examiner

MULTI-FUNCTIONAL ACOUSTICAL FOAM BOARD

BACKGROUND

Board insulation is widely used to insulate roofs, floors, walls, attics, and crawl spaces of residential, commercial, and industrial buildings. Specifically, foam boards are commonly used in such applications due to their excellent thermal insulation, flame resistance, air, water and vapor barrier properties, and mechanical properties. However, such foam boards are generally not designed to provide acoustic insulation properties. Accordingly, it would be beneficial for improved foam boards that provide greater acoustic insulation in addition to the more typical uses.

SUMMARY

One aspect of the disclosure provides for an insulation component, comprising a first foam layer having a first density and a second foam layer coupled to the first foam layer. The second foam layer has a second density less than the first density. The first and second foam layers comprise a similar material. The insulation component includes an average sound absorption coefficient between 0.1 and 0.4. The insulation component may include the average sound absorption coefficient at a frequency range between 50 and 2,050 Hz. The first foam layer may be coupled to the second foam layer through one or more of an adhesive, fastener, lamination, pour, or binder. The first foam layer may include a density between 1.4 and 1.9 pcf. The second foam layer may include a density between 0.3 and 0.8 pcf. The insulation component may further comprise a facer layer coupled to either the first or second foam layers. The facer layer may include at least one of a plurality of microparticles or perforations. A wall system may comprise a will and the above insulation component.

Another aspect of the disclosure provides for an insulation component, comprising a first foam layer having a closed-cell structure and a first density and a second foam layer coupled to the first foam layer, the second foam layer having an open-cell structure. The second foam layer has a second density less than the first density. The first and second foam layers comprise a similar material. The insulation component provides an average sound absorption coefficient between 0.1 and 0.4. The insulation component may include the average sound absorption coefficient at a frequency range between 50 and 2,050 Hz. The first foam layer may be coupled to the second foam layer through one or more of an adhesive, fastener, lamination, pour, or binder. The first foam layer may include a density between 1.4 and 1.9 pcf. The second foam layer may include a density between 0.3 and 0.8 pcf. The insulation component may further comprise a facer layer coupled to either the first or second foam layers. The facer layer may include a plurality of microparticles or perforations. A wall system may comprise a will and the above insulation component.

Yet another aspect of the disclosure provides for a method of forming an insulation component, comprising providing a first polyol, adding a first isocyanate to the first polyol to form a first foam core, wherein the first foam core includes a first density, providing a second polyol, and adding a second isocyanate to the second polyol to form a second foam core. The second foam core has a second density less than the first density. The first and second foam cores comprise a similar material. The method further comprises coupling the first foam core and the second core together to form the insulation component. The insulation component provides an average sound absorption coefficient between 0.1 and 0.4. The insulation component may include the average sound absorption coefficient at a frequency range between 50 and 2,050 Hz. The first foam core may include a density between 1.4 and 1.9 pcf. The second foam core may include a density between 0.3 and 0.8 pcf.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
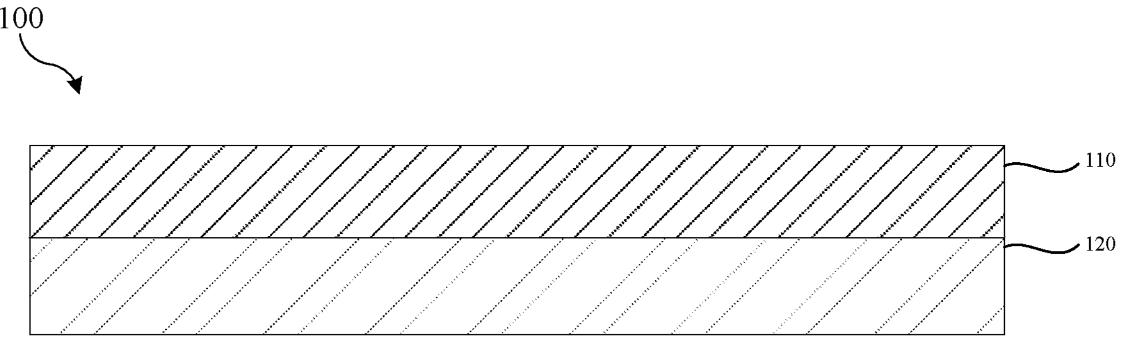
FIG. 1 illustrates a cross-sectional view of an insulation component according to one embodiment of the disclosure.

Foam boards used in buildings, such as in the walls of the buildings, may be designed to provide a number of functions. For example, foam boards may be used to provide insulative properties (e.g., thermal insulation, flame resistance, air, water and vapor barrier resistance, and mechanical properties) but are typically not used for acoustic insulation. In particular, such foam boards may be closed-cell foam boards as such boards are dense and provide excellent values of thermal insulative properties. In some examples, closed-cell foam boards may be combined with impermeable facers to achieve these desired insulative properties. However, closed-cell foam boards do not typically provide great acoustic insulation. Open-cell foams, on the other hand, provide greater acoustic insulation than closed-cell foams but do not generally provide the same level of thermal insulation, flame resistance, water resistance, and mechanical properties as well as closed-cell foams.

Acoustic control, especially in the low frequency range of <1000 Hz and preferably <500 Hz range, is becoming particularly important in multiunit buildings such as apartments, dorms, office buildings, hotels, classrooms and similar type buildings. Several properties of the insulation structure can influence behavior of sound waves such as mass, stiffness, porosity and the like. For homogenous materials sound transmission can be described by the so-called mass law of sound insulation. The most important physical property controlling the airborne sound transmission loss through an assembly is the mass per unit area of its component layers. The "mass law" dictates that the greater the mass of the wall, the greater the sound energy required to set it in motion. As such, in order to cope with the higher demand for good noise control in modern buildings, vehicles and aerospace, the sound control elements theoretically need to be heavier (higher in mass) to block low frequencies. However, this is contrary to the demand for lighter weight materials required for modern building designs and resource conservation.

For example, in materials of a lightweight or given density, one can improve acoustic control by increasing the thickness of the material. For low frequency sound control, materials on the order of 1-4 meters would be required to provide adequate acoustic control, which again is impractical in modern multiunit construction. Therefore, there is a need for thin, lightweight construction materials with enhanced acoustic control.

The present disclosure relates to an insulation component (e.g., a foam board) with multiple layers of different densities or a single layer with varying density (e.g., a density gradient). The combination of the layers of different densities may provide excellent thermal insulation, flame resistance, water resistance, mechanical properties, and acoustic insulation. In particular, the insulation component may include a first layer having a greater density than a second layer. For example, the first layer may be a closed-cell foam layer while the second layer may be an open-cell foam layer. The closed-cell foam layer may provide thermal insulation, flame resistance, water resistance, and mechanical properties while the open-cell foam layer may provide acoustic insulation such that the insulation component may include all of these insulative properties. Further, the insulation component may include a perforated facer and/or insulation body for improved acoustic performance.

I. Exemplary Insulation Component

Exemplary insulation components are described below.

A. First Exemplary Insulation Component

FIG. 1 depicts a cross-sectional view of an exemplary insulation component 100. For example, the insulation component 100 may be an insulation component used in buildings, such as a foam board. The insulation component 100 may include a first insulation layer 110 and a second insulation layer 120. Although FIG. 1 depicts two layers 110, 120, in other embodiments, there may be more than two insulation layers, as described further below. As will be discussed further below, the insulation component may be one layer. Each of the layers 110, 120 may be chemically bound together as a cured matrix (e.g., the crosslinking of polymer chains), or with a binding element (e.g. adhesive), as discussed below, such that the installation component 100 is monolithic. Specifically, the insulation component 100 may include no gaps between the layers 110, 120 and no weak points to separate the layers 110, 120 from each other. In other embodiments, the insulation layers may be mechanically coupled together, such as with fasteners or the like. In yet further embodiments, the layers 110, 120 may be directly coupled together through the inherent tackiness of the material of the layers 110, 120 (e.g., the inherent tackiness of the foam material of the layers 110, 120). In other words, the layers 110, 120 may couple with each other by contacting each other without any intervening components and coupled by the inherent tackiness of the material of the layers 110, 120 from that contact.

The layers 110, 120 may include a foam material. For example, the layers 110, 120 may include polystyrene (XPS and EPS), polyolefin (PE and/or PP and/or EPDM foam), polyester, polyimide, polymethacrylamide, phenolic foam. In some embodiments, the layers 110, 120 may include a polyurethane or polyisocyanurate (polyiso) foam material, which has been widely used to insulate roofs and walls of residential, commercial, and industrial buildings due to its excellent thermal insulation, flame resistance, water resistance, and mechanical properties. The excellent flame resistance may be due in part to the formation of an isocyanurate trimer during the foaming process. The foam density of the polyurethane or polyisocyanurate foam can vary over a wide range and is mainly controlled by an amount of blowing agent that is used during formulation of the foam.

The polyiso foam may be a low rise foam and/or a high rise foam and may be a closed-cell and/or open-cell foam in various embodiments. The polyiso foam may be provided as a single and/or continuous layer of foam in some embodiments, which may enable the insulation layers 110, 120 to be generally uniform across a thickness of the insulation layers 110, 120 and to have a greater consistency in cellular structure. Further, this may enable the insulation layers 110, 120 to be thinner, while still providing the same level of thermal insulation. Due to the uniformity of the insulation layers 110, 120, embodiments may also provide improved air and vapor sealing.

The thickness of the insulation layers 110, 120 may determine the final shape of the insulation component 100. The insulation layers 110, 120 may be between about 0.5 and 18 inches thick. In some embodiments, the insulation component 100 may be substantially flat. In such embodiments, the thickness of the insulation layers 110, 120 may be substantially constant across the insulation component 100. For example, the thickness of the insulation layers 110, 120 may be uniform to within 10%, to within 5%, to within 3%, to within 1%, to within 0.5%, or less. In other embodiments, the insulation component 100 may include one or more contoured areas, tapered areas, and/or stepped regions of different heights. In such embodiments, the thickness of the insulation layers 110, 120 may be varied across the area of the insulation component 100. It will be appreciated that the insulation component 100 may have any shape (e.g., flat, tapered, stepped, contoured, etc.) by controlling the thickness of the insulation layers 110, 120.

The polyiso foam may be a low-density foam or a high density foam, depending on the application, as will be discussed below. For example, the density of the polyiso foam may be between about 0.5 pcf and 7 pcf. The polyiso foam may be an open-cell foam or a closed-cell foam and may be a high lift foam or a low lift foam based on the needs of a particular application.

The polyiso foam may be formed from a mixture of an isocyanate and a polyol. For example, polyfunctional isocyanates that may form substituted or unsubstituted polyisocyanates that are used to make the polyiso foam and other foam products include aromatic, aliphatic, and cycloaliphatic polyisocyanates having at least two isocyanate functional groups. Exemplary aromatic polyfunctional isocyanates include: 4,4'-diphenylmethane diisocyanate (MDI), polymeric MDI (PMDI), toluene disisocyanate, and allophanate modified isocyanate. For example, the polyfunctional isocyanate may be PMDI with functionality between 2.3 to 3.0, viscosity less at 800 cps at 25° C., and isocyanate content between 28% to 35%.

The polyfunctional isocyanates may be reacted with a polyfunctional co-reactant that has at least two reactive groups that react with the polyfunctional isocyanate to produce a polyisocyanurate compounds for the present products. Exemplary polyfunctional co-reactants may include polyester and polyether polyols having at least 2 isocyanate reactive groups, such as hydroxyl groups. Specific examples include aromatic polyester polyols which have good mechanical properties, as well as hydrolytic and thermo-oxidative stability. Commercially available polyester polyol include those sold by Stepan Company under the name Stepanol® and those sold by Huntsman Corporation under the name of Terol®. Exemplary polyols may have a functionality between 2 and 2.5 and hydroxyl number between 150 mg KOH/gm and 450 mg KOH/gm.

The catalysts used to polymerize the polyisocyanurates may include amine catalysts and metal catalysts, among other catalysts. The amine catalysts catalyze both urethane reactions between isocyanates and polyols, and urea reactions between water and isocyanates. The metal catalysts may include metal carboxylate trimer catalysts, which promote the conversion of isocyanate to highly thermally stable isocyanurate ring. Examples of suitable amine catalysts include pentamethyldiethylenetriamine (PMDETA), dimethylcyclohexylamine, and 1,3,5-tris(3-(dimethylamino)propyl)-hexahydro-triazine. Examples of suitable metal catalysts include potassium octoate and potassium acetate.

The present polyisocyanurate formulations may also include one or more surfactants. The surfactants function to improve compatibility of the formulation components and stabilize the cell structure during foaming. Exemplary surfactants can include organic or silicone based materials. Typical silicone based surfactants may include polyether modified polysiloxane, such as commercially available DC193 surfactant from AirProducts, Tegostab® series surfactants from Evonik, such as Tegostab® 8535, and Vorasurf™ sold by The Dow Chemical Company and DC 193 sold by Dow Corning Company.

The polyol typically includes either or both a polyether and polyester having a hydroxyl number between about 25 and 500, and more commonly between about 200 and 270. The hydroxyl number is a measure of the concentration of the hydroxyl group in the polyol, which is expressed as the milligrams of KOH (potassium hydroxide) equivalent to the hydroxyl groups in one gram of polyol. Polyether is commonly not used in conventional polyisocyanurate foam boards because it is typically less flame resistant than the aromatic polyester that is used in such boards. A lower hydroxyl number commonly results in longer polymer chains and/or less cross linking, which results in a relatively loose polymer chain. In contrast, a higher hydroxyl number commonly results in more cross linking and/or shorter polymer chains, which may provide enhanced mechanical properties and/or flame resistance.

An isocyanurate is a trimeric reaction product of three isocyanates forming a six-membered ring. The ratio of the equivalence of NCO groups (provided by the isocyanate-containing compound or A-side) to isocyanate-reactive groups (provided by the isocyanate-containing compound or B side) may be referred to as the index or ISO index. When the NCO equivalence to the isocyanate-reactive group equivalence is equal, then the index is 1.00, which is referred to as an index of 100, and the mixture is said to be stoichiometrically equal. As the ratio of NCO equivalence to isocyanate-reactive groups equivalence increases, the index increases. Above an index of about 150, the material is generally known as a polyisocyanurate foam, even though there are still many polyurethane linkages that may not be trimerized. When the index is below about 150, the foam is generally known as a polyurethane foam even though there may be some isocyanurate linkages.

The polyiso foam may have an isocyanate index greater than about 200, commonly between about 200 and 300, and more commonly between about 250 and 270. When isocyanate reacts with one or more polyols to form polyurethane, one NCO group reacts with one OH group. As is known in the art, the index is defined as the ratio of NCO group to OH group multiplied by 100 as shown in the formula below:

$$\text{Index} = \frac{\text{Moles of NCO group}}{\text{Moles of OH group}} \times 100$$

When the number of NCO group equals the number of OH group in a formulation, a stoichiometric NCO:OH ratio of 1.0 is realized and a polyurethane polymer/foam is produced. When the number of NCO groups is significantly more than the number of OH groups in a formulation, the excess isocyanate group reacts with itself under catalytic condition to form isocyanurate linkage and polyisocyanurate foam is produced. The above described isocyanate index, and especially an index of between about 250 and 270, provides at least a 2:1 ratio of NCO groups to OH groups, which has been found to provide an appreciable combination of structure integrity, thermal strength and/or stability, and fire resistance. In some embodiments, the isocyanate index may be between 250-300.

In some embodiments, the polyiso foam may include between 1 and 10 weight percent of a hydrocarbon blowing agent, such as n-pentane, iso-pentane, cyclopentane, and their blends. In an exemplary embodiment, the polyiso foam may include between 5 and 8 weight percent of the hydrocarbon blowing agent. The weight percent of the hydrocarbon blowing agent typically corresponds with the foam density of the polyiso foam with lower density foam boards (e.g., insulation boards) having a higher weight percentage of the hydrocarbon blowing agent than more dense foam boards. For example, insulation boards having a density of between about 1.5 and 2.5 pounds per cubic foot (lbs/ft$^3$), commonly have 5% or more of a hydrocarbon blowing agent by weight, and more commonly between about 6 and 7 weight percent. In contrast, insulation boards that have a density of up to 10 lbs/ft$^3$, and more commonly between 6 and 7 lbs/ft$^3$, commonly have less than 5% of a hydrocarbon blowing agent by weight, and more commonly between about 1.5 and 3 weight percent. In some embodiments, the polyiso foam may include other substances, such as various coatings.

An amine catalyst may include a tertiary amine, treiethylenediamine (TEDA), N-methylimidazole, 1,2-dimethylimidazole, N-methylmorpholine, N-ethylmorpholine, triethylamine, N,N'-dimethyl-piperazine, 1,3,5-tris(dimethylaminopropyl)hexahydrotriazine, 2,4,6-tris(dimethylamino-methyl)phenol, N-methyldicyclohexylamine, pentamethyldipropylene triamine, N-methyl-N'-(2-dimethylamino)-ethyl-piperazine, tributylamine, pentamethyldiethylenetriamine, hexamethyltriethylenetetramine, heptamethyltetraethylenepentamine, dimethylamino-cyclohexylamine, pentamethyldipropylenetriamine, triethanolamine, dimethylethanolamine, bis(dimethylaminoethyl)ether, tris(3-dimethylamino)propylamine, 1,8-diazabicyclo[5.4.0]undecene, bis(N,N-dimethylaminopropyl)-N'-methyl amine and their acid blocked derivatives, and mixtures thereof.

Emulsifiers may include nonylphenolethoxylates (NPEs), oxyethylated fatty alkyl phenols (NPEs), oxyethylated fatty alcohols (alkylethoxylated alcohols), foam stabilizing agents such as silicone polyethers, among other conventional additives and agents. An emulsifier may include NP-9. Amine catalysts and emulsifiers are described in U.S. Patent Publication No. 2012/0202903, which is incorporated herein by reference for all purposes.

Surfactants may reduce surface tension during foaming and may affect the cell structure of the foam. Surfactants may include a silicone surfactant, an organic surfactant, a silicone polyether copolymer, silicone-polyoxyalkylene block copolymers, nonionic polyoxyalkylene glycols and their derivatives, ionic organic salts, ether sulfates, fatty alcohol sulfates, sarcosinates, amine oxides, sulfonates, amides, sulf-succinates, sulfonic acids, alkanol amides, ethoxylated fatty alcohol, and nonionics such as polyalkoxylated sorbitan. Example surfactants may include polydimethylsiloxane-polyoxyalkylene block copolymers. Other surfactants are described in European Patent Application No. EP1578832, which is incorporated herein by reference for all purposes.

The insulation component 100 may be materially homogenous in that the layers 110, 120 are formed of substantially the same material, although of different densities. For example, the insulation component 100 may be formed of substantially the same material when the materials of each of the layers 110, 120 have a greater than about 50 wt. % in similarity, such as greater than about 60 wt. %, such as greater than about 70 wt. %, such as greater than about 80 wt. %, such as greater than about 90 wt. %, or such as being about 100% the same. However, in other embodiments, the insulation layers of the insulation component may each be made of a different material.

Each of the insulation layers 110, 120 may have a different density such that each of the insulation layers 110, 120 may provide different insulative properties. For example, the first insulation layer 110 may have a density that provides one or more of a greater thermal insulation, flame resistance, water resistance, and mechanical properties. The second insulation layer 120 may have a density that provides a greater acoustic insulation than the first insulation layer 110. The first insulation layer 110 may have a higher density than the second insulation layer 120, however, in other embodiments, the second insulation layer may have a higher density than the first insulation layer. The layers 110, 120 may be an open- or closed-cell foam based on their corresponding densities, as discussed below.

The first insulation layer 110 may have a density between about 1 pcf and 4 pcf, such as between about 1.25 pcf and 3.75 pcf, such as between about 1.5 pcf and 3.5 pcf, such as between about 1.75 pcf and 3.25 pcf, such as between about 2 and 3 pcf, such as between about 2.25 pcf and 2.75 pcf, or about 2.5 pcf. In particular, the first insulation layer 110 may include a preferred density between about 1.4 pcf and 1.9 pcf, such as between about 1.45 pcf and 1.8 pcf, such as between about 1.5 pcf and 1.7 pcf, or such as between 1.55 pcf and 1.6 pcf. The first insulation layer 110 may be a foam insulation having a closed-cell structure. A closed-cell foam may have an open-cell content of less than 10%, such as less than about 8%, such as less than about 6%, such as less than about 4%, or such as less than about 2%. The high densities and closed-cell formulation of the first insulation layer 110 may provide excellent thermal insulation, flame resistance, water resistance, and mechanical properties.

The second insulation layer 120 may have a density less than 1.5 pcf, such as less than about 1.25 pcf, such as less than about 1 pcf, such as less than about 0.5 pcf, or such as less than about 0.25 pcf. In particular, the second insulation layer 120 may include a preferred density between about 0.2 pcf and 0.8 pcf, such as between about 0.25 pcf and 0.7 pcf, such as between about 0.3 pcf and 0.6 pcf, or such as between about 0.35 pcf and 0.5 pcf. The second insulation layer 120 may be a foam insulation having an open-cell structure. The open-cell foam insulation may have a tensile strength between about 3 psi and about 10 psi. An open-cell foam may have a closed-cell content of less than 10%, such as less than about 8%, such as less than about 6%, such as less than about 4%, or such as less than about 2%. The low densities and open-cell formation of the second insulation layer 120 may provide excellent acoustic insulation properties. In other embodiments, where the insulation component is one layer, the single layer may include a gradient change in density of lower density from one surface to higher density at an opposite surface.

The thermal resistance (referred to as R-value) of the insulation layers 110, 120 may be based on a thickness of the respective layers 110, 120. For example, where the first insulation layer 110 is a high-density, closed-cell foam, the first insulation layer 110 may provide an R-value between 4.5 and 8 per inch of thickness of the first insulation layer 110, such as an R-value of between about 4.75 and 7.5 per inch of thickness, such as an R-value of between about 5 and 7 per inch of thickness, such as an R-value of between about 5.25 and 6.5 per inch of thickness, or an R-value of about 6 per inch of thickness.

On the other hand, where the second insulation layer 120 is a low-density, open-cell foam, the second insulation layer 120 may provide an R-value between about 3 and 4.5 per inch of thickness of the second insulation layer 120, such as between about 3.25 and 4.25 per inch of thickness, such as between about 3.5 and 4 per inch of thickness, or such as about 3.75 per inch of thickness.

As noted above, foam insulation comprising only one of an open- or closed-cell foam layer may be unable to provide thermal insulation, flame resistance, water resistance, and mechanical properties as well as acoustic insulation. However, the insulation component 100 may address this issue by including both a closed-cell foam insulation layer 110 and an open-cell foam insulation layer 120. In this example, the open-cell foam insulation layer 120 may provide a greater acoustic insulation than the closed-cell foam insulation layer 110. However, each of the insulation layers 110, 120 may, in combination, form the insulation component 100 to provide a large average sound absorption coefficient ("SAC") over a frequency range while still providing the insulative characteristics noted above (e.g., thermal insulation, flame resistance, water resistance, and mechanical properties. For example, for sounds within the range of 50 to 2,050 Hz, the insulation component 100 may provide an average SAC of between about 0.1 and 0.5, such as between about 0.2 and 0.4, or such as about 0.3.

This combination of layers 110, 120 in the insulation component 100 provides an unexpected benefit of providing excellent values for all of thermal insulation, flame resistance, air, water, and vapor barrier resistance, mechanical properties, and acoustic insulation. In particular, the benefit provided by the insulation component 100 is unexpected when the insulation component 100 is a foam board. Assemblies using conventional foam boards typically require more components in order to achieve the insulative properties provided by the insulation component 100. One example conventional foam board may include a closed-cell foam layer with an impermeable facer layer. However, the insulation component 100 may provide a similar or better amount of insulation while requiring less components (e.g., omitting cavity insulation), thus saving costs.

Figure 2:
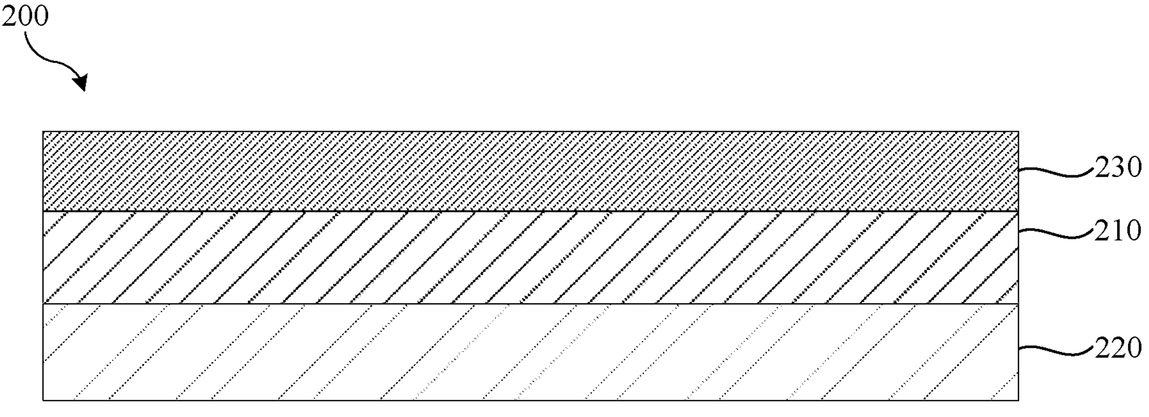
FIG. 2 illustrates a cross-sectional view of an insulation component according to one embodiment of the disclosure.

In other embodiments, there may be more than the two insulation layers 110, 120. For example, there may be three, four, five, or the like. FIG. 2 depicts an example insulation component 200 including a first insulation layer 210, a second insulation layer 220, and a third insulation layer 230. It is understood that features ending in like reference numerals as features discussed above are similar, except as noted below. Each of the layers 210, 220, 230 may have a different density. For example, the insulation layer 220 may have a lower density than the insulation layer 210 which, in turn, may have a lower density than the insulation layer 230. Accordingly, the layers 210, 220, 230 may effectively define a gradient of changing density going from the insulation layer 210 to the insulation layer 230. In some embodiments, the insulation component may define a continuous gradient along the thickness of the insulation component. In these examples, the insulation component may include properties as discussed above (e.g., density, R-value, or the like) when averaged across the gradient of changing density along the thickness of the insulation component. In other embodiments, the insulation layers 210, 220, 230 may not define a density gradient and, instead, the densities may be mixed such that the insulation component may include layers having an intermingled set of densities. For example, the insulation component may include a first insulation layer positioned between two insulation layers where the first insulation layer has a lower and/or higher density than the two adjacent insulation layers.

B. Second Exemplary Insulation Component

Figure 3A:
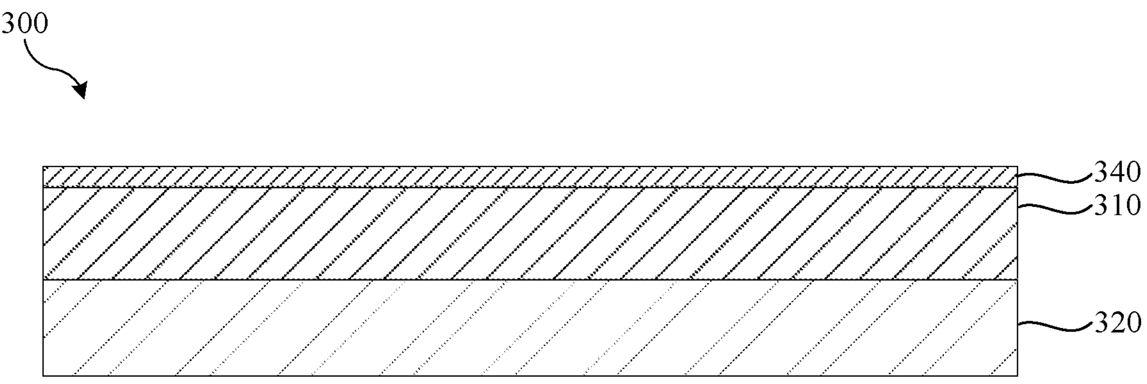
FIG. 3A illustrates a cross-sectional view of an insulation component according to one embodiment of the disclosure.
Figure 3B:
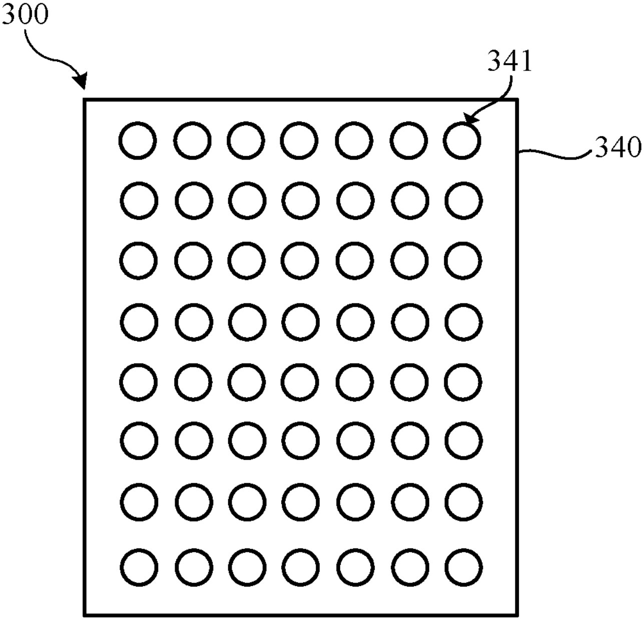
FIG. 3B illustrates a top view of the insulation of FIG. 3A.

Although the insulation component 100 may provide the acoustic insulation as noted above, in some embodiments, greater acoustic insulation may be desired. For example, it may be desirable for the insulation component 100 to additionally provide acoustic insulation at lower frequencies (e.g., frequencies lower than about 1,000 Hz, such as less than about 750 Hz, less than about 500 Hz, or less than about 250 Hz). Accordingly, other components may be coupled to the insulation component 100 to achieve greater acoustic insulation. For example, FIGS. 3A and 3B depict an example insulation component 300 including a first insulation layer 310, a second insulation layer 320, and a facer layer 340. It is understood that features ending in like reference numerals as features discussed above are similar, except as noted below. The facer layer 340 may be a coating or membrane structure coupled to the layers 310, 320. The facer layer 340 may be any of the materials listed above and may be chemically bound to the first insulation layer 310 with a binding element as described above. In other embodiments, the facer layer may be a fiber glass or polymeric material. For example, the facer layer 340 may include one or more of a thermoset or thermoplastic coatings, foamed coatings, porous coatings, visco-elastic coatings, or membranes with or without fillers.

The facer layer 340 may be an acoustic metamaterial defining perforations 341 extending through the facer layer 340 (e.g., in a direction toward the second insulation layer 220). The perforations 341 may extend through the entire thickness of the facer layer 340, however, in some embodiments, the perforations may extend only partially through the facer layer. The perforations 341 may allow for the facer layer 340 to provide greater acoustic insulation at lower sound frequencies while allowing for the facer layer 340 to be lightweight. It should be understood that the perforations 341 depicted along the facer layer 340 is for illustrative only and that the perforations 341 may be any size, shape, and concentration as described below.

The perforations 341 may be circular in shape, however, in other embodiments, the perforations may include any other shape, such as rectangular, triangular, any irregular shape (e.g., having a snowflake-like shape or the like), or the like. Preferably, the perforations 341 may be circular as this particular shape may provide greater acoustic insulation than other shapes. In some embodiments, the facer layer may define the perforations to include a combination of shapes rather than all the perforations just being a singular shape.

The perforations 341 may have a diameter between about 0.01 and 1 mm, such as between about 0.025 and 0.75 mm, between about 0.05 and 0.5 mm, between about 0.075 and 0.4 mm, or such as between about 0.1 and 0.3 mm. The facer layer 340 may include a percentage of open layer (i.e., percentage of the facer layer 340 that is perforated) between about 0.1% and 10%, such as between about 0.1% and 5%, such as between about 0.125% and 3%, such as between about 0.15% and 2%, such as between about 0.175% and 1%, or such as between about 0.2% and 0.7%. In other words, between about 98% and 99.9% of the facer layer 340 may be free of perforations 341.

In some embodiments, the perforations 341 may each be equidistantly spaced from each other along the facer layer 340. However, in other embodiments, at least some of the perforations may be spaced out from each other with different sized spacing. In some embodiments, the facer layer 340 may be concentrated towards the center such that the facer layer 340 defines a boundary of between the perforations 341 and the edge of the facer layer 340. In other words, a portion of the facer layer 340 between the edge of the facer layer 340 and the perforations 341 may be free of perforations 341.

The facer layer 340 may include multiple perforated layers. Each of the perforated layers may have perforations of any size, shape, and concentration. Further, the perforated layers may have the same or different thicknesses, and be the same or different materials depending on the desired insulative properties (e.g., the desired acoustic insulation). In some embodiments, the perforations of each perforated layer may be aligned, however, in other embodiments, the perforations of at least two of the perforated layers may be offset from each other. Such multiple perforated layers may cumulatively form a facer layer 340 to provide a desired acoustic insulation.

In other embodiments, the facer layer 340 may additionally or alternatively include microparticle layers (i.e., layers of the facer layer 340 that include microparticles dispersed throughout). The microparticles may increase the acoustic insulation of the facer layer 340. Due to the possible combinations of different materials and/or different hardness, the microparticles can have varying densities. The microparticles may be of different hardness or a combination of hardness, such as hard shell and soft core or vice versa. The hardness can range from a Shore 00 of 10 to Shore D of 99. Preferably soft materials will be in the range of Shore A 10-60, and hard materials in the range of Shore D 20-99, preferably Shore D of 40-90. The various shell and core ratios may be between about 10-90% core material to shell materials, such as between about 20-80%, between about 30-70%, between about 40-60%, or about 50%. The microparticles may be solid or porous. The porosity can be similar to open or closed-cell foam type porosities.

The microparticles may be made of glass (e.g., glass microspheres or glass beads), foams or polymers (e.g., polystyrene, polypropylene, cross-linked polyethylene, polyethylene, rubber, polyvinyl chloride, acrylic resin, polyurethane, or the like), metals (e.g., aluminum), or combination thereof. In some embodiments, the microparticles may include a magnetic material, such as a magnetic fluid or powder. For example, the microparticles may include iron oxide. The microparticles can be multilayered or multicomponent such core/shell type configuration, or hollow.

The microparticles may be spherical, however, in other embodiments, the microparticles may have any other shape. The microparticles may have an outer diameter between about 5 μm and 200 μm, such as between about 10 μm and 180 μm, such as between about 20 μm and 160 μm, such as between about 30 μm and 140 μm, such as between about 40 μm and 120 μm, such as between about 50 μm and 100 μm, such as between about 60 μm and 80 μm. Alternatively, the microparticles may not be spherical. In this example, the microparticles may have dimensions with an aspect ratio of between 1000:1 and 0.1:1, such as between about 100:1 and 0.2:1, such as between about 50:1 and 0.3:1, such as between about 10:1 and 0.4:1, or about 5:1 and 0.5:1.

The microparticle can also comprise an agglomerate or agglomerated materials. The agglomerate can comprise a porous material, a solid material and a binder material. The porous material can be expanded graphite, carbon particles from wood or cellulosic materials, cellulosic fibers, porous alumina, mica, perlite, granulated or powdered polyurethane foam particles, waste polyurethane materials, or other soft or hard porous or absorptive materials. The solid material can be common fillers or particles such as clay, slag, metal particles such as aluminum, iron, steel, copper, tin, etc., natural minerals or glasses, synthetic minerals or glasses, glass or waste glass particles. The binder can be either organic or inorganic. Any common organic binder can be used such as thermoplastic or thermoset binders. These binders can be soft, elastomeric, or hard and rigid. Inorganic binders such as sodium silicate or silicate, cementitious, or pozzolanic materials can be used. The binders can be foamed during agglomeration to enhance the porosity and create density variations or gradients within the particle or particle mix. The porous material can be 10-90% by wt., The material can be 0-50% by wt. and the binder material can be 10-90% by wt. The agglomerates can have a particle size of from 50 micrometer to 1000 micrometers and a specific surface area of from 50 $m^2/g$ to 1000 $m^2/g$.

The facer layer 340 may have a microparticle concentration, by weight, of between about 2% and 10%, such as between about 3% and 9.5%, such as between about 4% and 9%, such as between about 5% and 8.5%, such as between about 6% and 8%, or such as about 7.5%. The microparticles may have a density between about 0.1 g/cc and 1.5 g/cc, such as between about 0.2 g/cc and 1.4 g/cc, such as between about 0.3 g/cc and 1.3 g/cc, such as between about 0.4 g/cc and 1.2 g/cc, such as between about 0.5 g/cc and 1.2 g/cc, such as between about 0.6 g/cc and 1.1 g/cc, such as between about 0.7 g/cc and 1 g/cc, such as between about 0.8 g/cc and 0.9 g/cc.

In some embodiments, the facer layer 340 may include both a first layer including perforations and a second layer having microparticles. Further, there may be multiple microperforated layers and layers with microparticles. In yet other embodiments, there may be more than one facer layer 340, such as a facer layer on either side of the insulation layers, or more than two facer layers.

II. Exemplary Wall Systems or Insulated Structures

Wall structures or systems of commercial and residential structures are commonly insulated by filling a wall cavity that is positioned between wall studs (wood or metal). The wall cavity may be filled using a spray foam insulation, batt or roll insulation (e.g., fiberglass, mineral wool, cotton, and the like), loose fill insulation (e.g., fiberglass, cellulose, mineral wool, and the like), or a combination thereof. Thermal bridging from the wall studs can reduce the effectiveness of the cavity insulation. To reduce the effects of thermal bridging, the wall system or structure may include external sheathing insulation (e.g., continuous insulation), such as with a foil faced rigid polyisocyanurate foam board, that is coupled with the cavity insulation.

Figure 4:
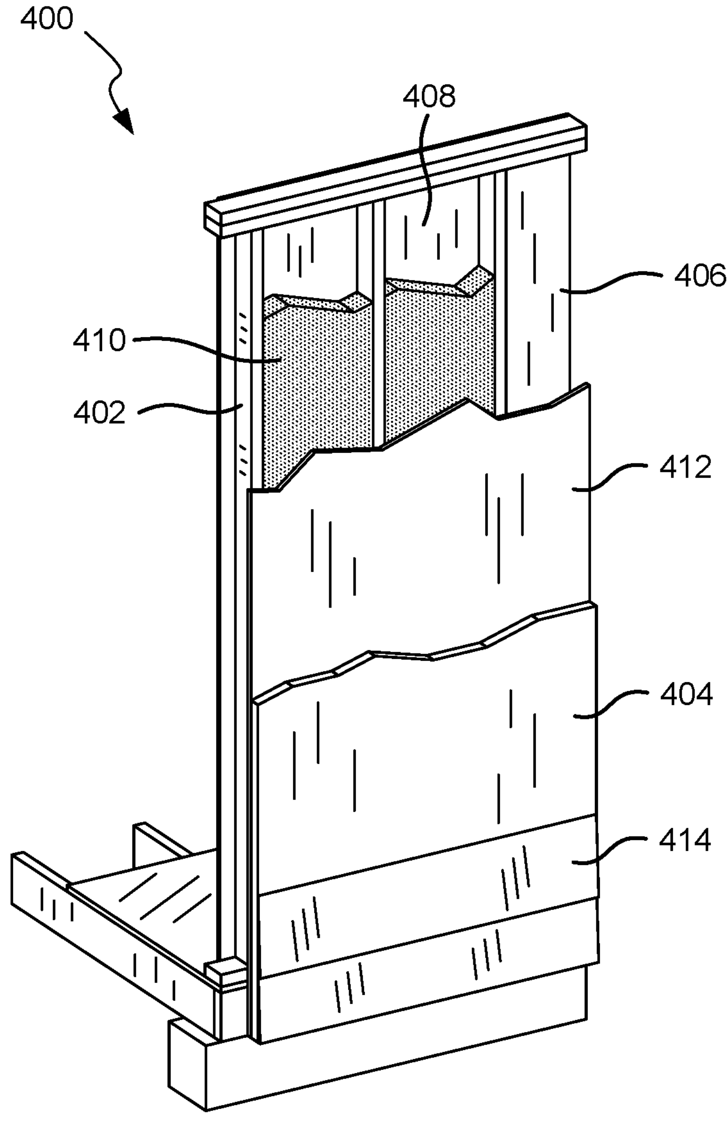
FIG. 4 illustrates an example wall system including an insulation component according to one embodiment of the disclosure.

Referring now to FIG. 4, illustrated is an embodiment of a wall system (or structure) 400 that may be used to insulate a commercial or residential structure. It is understood that features ending in like reference numerals as features discussed above are similar, except as noted below. Wall system 400 includes a plurality of structural support members or wall studs 402 that may be coupled together to form a wall frame. A plurality of foam boards 404 may be attached to an exterior side of the frame to form an insulative exterior wall or surface of the wall system 400 (i.e., continuous external sheathing insulation). The foam boards 404 may be similar to either of the insulation component 100, 200, 300. A plurality of wall boards 406 may be attached to an interior side of the frame opposite the foam boards 404 to form an interior wall or surface of the wall system 400. Example wall boards 406 may include gypsum boards or the like. The wall studs 402, foam boards 404, and wall boards 406 may define a plurality of wall cavities 408.

Fasteners (not shown) may be used to attach the foam boards 404 and wall boards 406 to the respective sides of the frame. Each fastener may include an elongate shaft that penetrates through a respective board and into a wall stud 402 to couple the components together. Example fasteners may include nails and screws, although in some embodiments non-mechanical fasteners may be used, such as adhesives and the like. An insulation material 410 may be positioned within at least one of the wall cavities 408 of the wall system, and more commonly within each wall cavity 408 or within most of the wall cavities. The insulation material 410 is positioned within the wall cavity 408 to insulate the building or structure. As described herein, example insulation materials may include spray or pour foam insulation (open-cell and/or close cell), batt or roll insulation (e.g., fiberglass, mineral wool, cotton, and the like), loose fill insulation (e.g., fiberglass, cellulose, mineral wool, and the like), or a combination thereof. The spray foam insulation may be any spray foam insulation described herein.

In some embodiments, an additional wall board 412 may be attached to the exterior side of the frame. In some embodiments, the additional wall board 412 may be free of a halogenated fire retardant. The additional wall board 412 may be a gypsum board, cement board, oriented strand board (OSB), plywood, and the like. Wall board 412 may be positioned between the foam board 404 and frame or wall studs 402 for structural support and/or other purposes. External veneer or cladding 414 (hereinafter exterior cladding 414) may be positioned on an exterior side of the foam boards 404. In some embodiments, the exterior cladding 414 may be free of a halogenated fire retardant. The exterior cladding 414 may include brick, stucco, rock, siding, paneling, metal, aluminum composite materials, and the like that provides the structure with an aesthetic appeal while optionally also providing one or more desired mechanical or other characteristics. In some embodiments, a drainage cavity or barrier may be positioned between one or more of the components of the wall system, such as between the exterior cladding 414 and the foam boards 404. The wall system 400 may also include other components, layers, and/or materials that are not shown, such as flashing, primer, and the like.

Wall systems may include those described in U.S. application Ser. No. 14/299,571, now U.S. Pat. No. 9,523,195, which is incorporated herein by reference for all purposes.

III. Exemplary Method of Forming an Insulation Component

Figure 5:
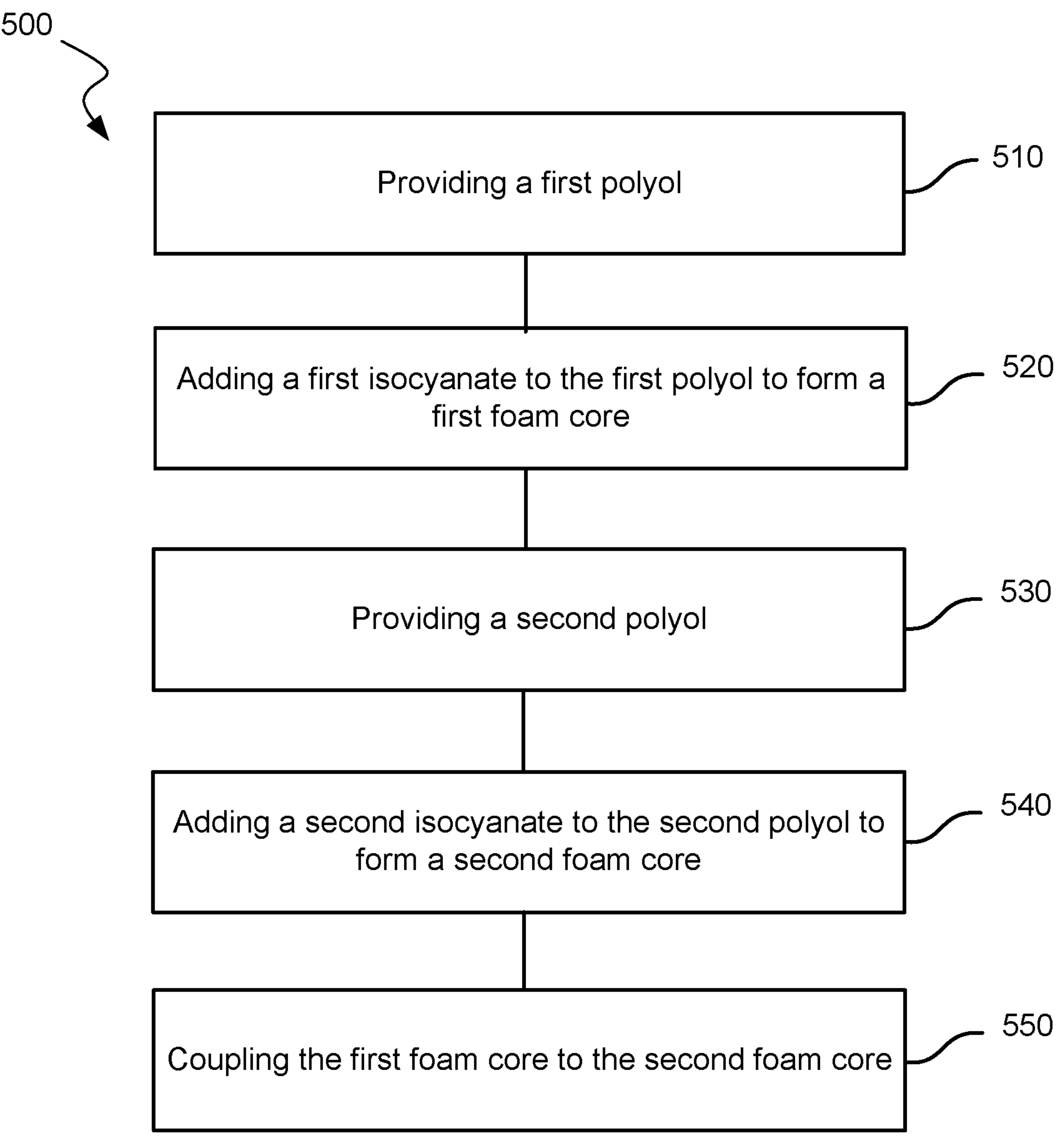
FIG. 5 illustrates a flowchart depicting a method of forming an insulation component according to one embodiment of the disclosure.

Referring now to FIG. 5, illustrated is a flowchart 500 depicting a method of forming an insulation component, such as the insulation component 100, 200, 300. For example, the flowchart 500 may include forming a polyiso foam board. At block 510, a first polyol may be provided. At block 520, a first isocyanate is added to the first polyol to form a first polyiso foam core, such as the first insulation layer 110, 210. At block 530, a second polyol may be provided. The second polyol may be similar to the first polyol, however, in other embodiments, the second polyol may be different than the first polyol. At block 540, a second isocyanate is added to the first polyol to form a second polyiso foam core, such as the second insulation layer 120, 220. The second isocyanate may be similar to the first isocyanate, however, in other embodiments, the second isocyanate may be different than the first isocyanate. The first and second polyiso cores may have different densities. For example, the first polyiso core may have a greater density than the second polyiso core. Further, the first polyiso core may be a closed-cell foam while the second polyiso core may be an open-celled foam. However, in other embodiments, the second polyiso core may have an equal density to the first polyiso core. Further, the second polyiso core may have a similar cell structure as the first polyiso core (i.e., both the polyiso cores may be an open- or closed-cell foam). In some examples, a fire retardant may be added to one or both of the first and second polyiso cores.

At block 550, the first and second polyiso cores may be coupled together to form a polyiso foam board. For example, the second polyiso core may be poured directly on the first polyiso core and the first and second polyiso cores may be coupled together through the inherent tackiness of the foams. In other embodiments, the first and second polyiso cores may be coupled together using an adhesive, fasteners, off-line or in-line lamination, spray, pour, rigid application, or the like. In another embodiment, the first and second polyiso cores may be coupled together with a binder (e.g., applying a binder between the first and second polyiso cores and curing the binder in a heating oven). In a yet further embodiment, more polyiso cores may be formed that each have different densities and each may be poured onto the first and second polyiso cores to form a polyiso foam board with a plurality of foam layers each having different densities to provide a particular desired set of insulative qualities. In this example, the foam board may have a density gradient such that the density gradually changes from a higher density to a lower density.

A first facer layer (e.g., the facer layer 340) may be optionally coupled with a surface of one of the first or second polyiso cores. For example, the first facer layer may be coupled to the second polyiso core with an adhesive, fastener, or the like. In other embodiments, the second polyiso core may be poured directly on the first facer layer and the first facer layer may be coupled to the second polyiso core through the inherent tackiness of the foam material of the second polyiso core. In a yet further embodiment, a second facer layer may be coupled to a surface of the first polyiso core opposite the first facer layer. The second facer layer may be similar to the first facer layer, however, in other embodiments, the first and second facer layers may be different.

Example 1

Samples of polyiso foam insulation component were tested for acoustic absorption using ASTM E1050-19 with the high-density foam facing the sound source and the low-density foam layer coupled to a structure (e.g., a rigid backing layer, such as a heavy metal layer). The high-density and low-density foam layers were tested with a variety of thicknesses ranging from 1 inch to 3 inches. Regarding the high-density foam: "AP Foil" is a closed-cell polyisocyanurate foam with a density of 1.7 pcf; "AP Foil 25 PSI" is similar to the AP Foil with a density of 2.1 pcf; "CC SPF" is a closed-cell spray polyurethane foam with a density of 1.8 pcf. Regarding the low-density foam: "HYOC" is a high-yield open-cell spray polyurethane foam; "OC SPF" is an open-cell spray polyurethane foam. Each sample had an external facer (e.g., facing the sound source) and interior facer (e.g., facing the structure). "Bilam" is a bilaminate facer comprising kraft paper laminated on aluminum foil. "CI MAX" is a glass-mat-reinforced aluminum facer. "GoBoard" is the GoBoard® facer from John Mansville, which is a coated glass facer. The samples were tested in a range of frequencies from 63 Hz to 2000 Hz. The testing also included a reference sample comprising a 3" AP Foil high-density foam layer with a Bilam exterior and interior facer but with no low-density foam layer. Each sample was tested multiple times and then averaged to provide the values below for each frequency.

TABLE 1

| | Sample 1 | Sample 2 | Sample 3 | Sample 4 | Sample 5 | Sample 6 | Sample 7 | Sample 8 | Sample 9 | |
|---|---|---|---|---|---|---|---|---|---|---|
| | Bilam | Bilam | Bilam | Bilam | CI MAX | GoBoard MB | Bilam | Bilam | Bilam | Reference |
| External Facer | 1' AP Foil | 1' AP Foil 25 PS | 2' CC SPF | 2' AP Foil | 1' AP Foil | 1' AP Foil | 1' AP Foil | 1' AP Foil | 1' AP Foil | Bilam |
| High-Density Foam | 2' HYOC | 2' HYOC | 2' HYOC | 2' HYOC | 2' HYOC | 2' HYOC | 2' OC SPF | 1' HYOC | 3' HYOC | 3' AP Foil |
| Low-Density Foam | Bilam | Bilam | Bilam | Bilam | Bilam | Bilam | Bilam | Bilam | Bilam | Bilam |
| Interior Facer | Average | Average | Average | Average | Average | Average | Average | Average | Average | Average |
| Frequency | SAC | SAC | SAC | SAC | SAC | SAC | SAC | SAC | SAC | SAC |
| (Hz) | 3 tests | 3 tests | 3 tests | 5 tests | 3 tests | 3 tests | 3 tests | 3 tests | 3 tests | 6 tests |
| 63 | 0.01 | 0.01 | 0.06 | 0.08 | 0.13 | 0.04 | 0.07 | 0.04 | 0.04 | 0.02 |
| 80 | 0.02 | 0.01 | 0.05 | 0.09 | 0.16 | 0.04 | 0.08 | 0.03 | 0.03 | 0.02 |
| 100 | 0.02 | 0.02 | 0.05 | 0.11 | 0.19 | 0.03 | 0.11 | 0.03 | 0.02 | 0.03 |
| 125 | 0.01 | 0.01 | 0.05 | 0.13 | 0.20 | 0.03 | 0.16 | 0.02 | 0.02 | 0.03 |
| 160 | −0.01 | −0.02 | 0.02 | 0.15 | 0.17 | 0.01 | 0.22 | 0.00 | 0.00 | 0.01 |
| 200 | 0.01 | 0.01 | 0.04 | 0.21 | 0.16 | 0.02 | 0.32 | 0.02 | 0.02 | 0.04 |
| 250 | 0.01 | 0.01 | 0.03 | 0.19 | 0.13 | 0.02 | 0.38 | 0.01 | 0.01 | 0.04 |

TABLE 1-continued

| External Facer<br>High-Density Foam<br>Low-Density Foam<br>Interior Facer<br>Frequency<br>(Hz) | Sample 1<br>Bilam<br>1' AP Foil<br>2' HYOC<br>Bilam<br>Average<br>SAC<br>3 tests | Sample 2<br>Bilam<br>1' AP Foil 25 PS<br>2' HYOC<br>Bilam<br>Average<br>SAC<br>3 tests | Sample 3<br>Bilam<br>2' CC SPF<br>2' HYOC<br>Bilam<br>Average<br>SAC<br>3 tests | Sample 4<br>Bilam<br>2' AP Foil<br>2' HYOC<br>Bilam<br>Average<br>SAC<br>5 tests | Sample 5<br>CI MAX<br>1' AP Foil<br>2' HYOC<br>Bilam<br>Average<br>SAC<br>3 tests | Sample 6<br>GoBoard MB<br>1' AP Foil<br>2' HYOC<br>Bilam<br>Average<br>SAC<br>3 tests | Sample 7<br>Bilam<br>1' AP Foil<br>2' OC SPF<br>Bilam<br>Average<br>SAC<br>3 tests | Sample 8<br>Bilam<br>1' AP Foil<br>1' HYOC<br>Bilam<br>Average<br>SAC<br>3 tests | Sample 9<br>Bilam<br>1' AP Foil<br>3' HYOC<br>Bilam<br>Average<br>SAC<br>3 tests | Reference<br>Bilam<br>3' AP Foil<br>Bilam<br>Average<br>SAC<br>6 tests |
|---|---|---|---|---|---|---|---|---|---|---|
| 315 | 0.01 | 0.01 | 0.03 | 0.15 | 0.11 | 0.02 | 0.34 | 0.01 | 0.01 | 0.05 |
| 400 | 0.01 | 0.01 | 0.03 | 0.1 | 0.10 | 0.02 | 0.26 | 0.01 | 0.01 | 0.05 |
| 500 | 0.01 | 0.01 | 0.03 | 0.09 | 0.09 | 0.02 | 0.19 | 0.01 | 0.01 | 0.06 |
| 630 | 0.01 | 0.01 | 0.04 | 0.2 | 0.09 | 0.02 | 0.20 | 0.01 | 0.01 | 0.06 |
| 800 | 0.01 | 0.01 | 0.05 | 0.2 | 0.13 | 0.03 | 0.49 | 0.81 | 0.01 | 0.07 |
| 1000 | 0.02 | 0.01 | 0.07 | 0.11 | 0.52 | 0.03 | 0.38 | 0.20 | 0.01 | 0.18 |
| 1250 | 0.03 | 0.02 | 0.25 | 0.23 | 0.19 | 0.06 | 0.20 | 0.20 | 0.03 | 0.15 |
| 1800 | 0.30 | 0.06 | 0.26 | 0.17 | 0.13 | 0.34 | 0.25 | 0.10 | 0.24 | 0.14 |
| 2000 | 0.29 | 0.39 | 0.08 | 0.14 | 0.11 | 0.08 | 0.28 | 0.49 | 0.33 | 0.20 |
| AVG | 0.05 | 0.04 | 0.07 | 0.15 | 0.16 | 0.05 | 0.25 | 0.05 | 0.05 | 0.07 |

From the data, it showed that on average Samples 4, 5, and 7 provided a greater SAC than the other samples. Specifically, the data shows that the OC SPF open-cell layer provides a greater sound absorption than the HYOC low-density foam layers (e.g., Sample 7 vs. Sample 8). Further, the data shows that a thicker high-density foam layer can be better than a thinner high-density foam layer (e.g., a 2" AP Foil in Sample 4 vs. 1" AP Foil in Sample 1). However, a non-high-yield open-cell spray polyurethane foam (e.g., Sample 7) better than a high-yield open-cell spray polyurethane foam even when paired with a thicker high-density foam layer (e.g., Sample 4). The data also shows that, in certain compositions of the insulation component, the CI Max facer provides better sound absorption than the GoBoard facer and the Bilam facer (e.g., Samples 5, 6, and 1). All of Samples 4, 5, and 7 provide greater average SAC than the Reference sample and, accordingly, show the increased acoustic performance from incorporating the low-density foam layers of these samples compared to the reference sample. In particular, these samples provided the greatest SAC values for lower frequencies (e.g., frequencies lower than 1,000 Hz).

Example 2

Samples of polyiso foam insulation component were tested for acoustic absorption using ASTM E1050-19 with the low-density foam facing the sound source and the high-density foam layer coupled to a structure (e.g., a rigid backing layer, such as a heavy metal layer as in Example 1). The materials for each of the noted layers in the table below are similar the materials as denoted above in Example 1.

TABLE 2

| External Facer<br>High-Density Foam<br>Low-Density Foam<br>Interior Facer | Sample 1<br>Bilam<br>1' AP Foil<br>2' HYOC<br>Bilam | Sample 2<br>Bilam<br>2' CC SPF<br>2' HYOC<br>Bilam | Sample 3<br>Bilam<br>2' AP Foil<br>2' HYOC<br>Bilam | Sample 4<br>CI MAX<br>1' AP Foil<br>2' HYOC<br>Bilam | Samples 5<br>Bilam<br>1' AP Fol<br>2' OC SPF<br>Bilam | Sample 6<br>Bilam<br>1' AP Foil<br>1' HYOC<br>Bilam |
|---|---|---|---|---|---|---|
| 63 | 0.07 | 0.06 | 0.09 | 0.09 | 0.07 | 0.03 |
| 80 | 0.08 | 0.06 | 0.10 | 0.10 | 0.09 | 0.03 |
| 100 | 0.08 | 0.06 | 0.12 | 0.13 | 0.12 | 0.03 |
| 125 | 0.09 | 0.07 | 0.14 | 0.16 | 0.16 | 0.04 |
| 160 | 0.07 | 0.05 | 0.15 | 0.19 | 0.18 | 0.02 |
| 200 | 0.08 | 0.08 | 0.20 | 0.24 | 0.19 | 0.05 |
| 260 | 0.09 | 0.08 | 0.22 | 0.20 | 0.15 | 0.05 |
| 315 | 0.10 | 0.09 | 0.27 | 0.17 | 0.12 | 0.07 |
| 400 | 0.14 | 0.11 | 0.29 | 0.19 | 0.13 | 0.08 |
| 500 | 0.32 | 0.13 | 0.38 | 0.21 | 0.20 | 0.10 |
| 630 | 0.77 | 0.17 | 0.64 | 0.28 | 0.37 | 0.12 |
| 800 | 0.75 | 0.33 | 0.88 | 0.66 | 0.67 | 0.22 |
| 1000 | 0.48 | 0.74 | 0.57 | 0.87 | 0.62 | 0.59 |
| 1250 | 0.29 | 0.77 | 0.49 | 0.64 | 0.36 | 0.95 |
| 1600 | 0.17 | 0.64 | 0.44 | 0.67 | 0.45 | 0.70 |
| 2000 | 0.68 | 0.56 | 0.32 | 0.52 | 0.43 | 0.50 |
| AVG | 0.27 | 0.25 | 0.33 | 0.33 | 0.27 | 0.22 |

From the data, it showed that, on average, Samples 3 and 4 provided the greatest SAC than the other samples. Specifically, the data shows that the CI Max external facer with a 1", AP Foil foam layer (e.g., Sample 4) and the 2" AP Foil foam layer with a Bilam external facer (e.g., Sample 3) can provide a greater average SAC than insulation components having a 1" AP Foil with a Bilam external facer (e.g., Samples 1, 5, and 6) and insulation components having a 2" CC SPF layer (e.g., Sample 2). Meanwhile, the 1" AP Foil and 1" HYOC foam layers of Sample 6 performed the worst.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Additionally, spatially relative terms, such as "bottom or "top" and the like can be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface can then be oriented "above" other elements or features. The device can be otherwise oriented (e.g., rotated 90 degrees or at other orientations) and the spatially relative descriptors used herein interpreted accordingly.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

In some implementations, operations or processing may involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining," or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

What is claimed is:

1. An insulation component comprising:

a first foam layer having a first density, and a first R-value between 4.5 and 8 per inch of thickness;

a second foam layer coupled to the first foam layer, wherein the second foam layer has a second density less than the first density and a second R-value less than the first R-value; and a third foam layer coupled to the second foam layer, wherein:

the third foam layer has a third density less than the second density;

the first foam layer, second foam layer, and third foam layer are coupled together free of an intervening layer;

the first and second foam layers comprise a similar material; and the first density, second density, and third density define a density gradient that at least partially provides an average sound absorption coefficient between 0.1 and 0.4 to the insulation component.

2. The insulation component of claim 1, wherein the insulation component includes the average sound absorption coefficient at a frequency range between 50 and 2,050 Hz.

3. The insulation component of claim 1, wherein the first foam layer includes a density between 1.4 and 1.9 pcf.

4. The insulation component of claim 1, wherein the second foam layer includes a density between 0.3 and 0.8 pcf.

5. The insulation component of claim 1, further comprising a facer layer coupled to either the first or second foam layers.

6. The insulation component of claim 5, wherein the facer layer includes at least one of a plurality of microparticles or perforations.

7. A wall system comprising:

a wall; and the insulation component of claim 1.

8. The insulation component of claim 1, wherein the first density, second density, and third density define the density gradient to be continuous.

9. The insulation component of claim 1, wherein the second R-value is between about 3 and 4.5 per inch of thickness.

10. An insulation component comprising:

a first foam layer having a closed-cell structure and a first density, and a first R-value between 4.5 and 8 per inch of thickness;

a second foam layer coupled to the first foam layer, wherein:

the second foam layer includes a second R-value less than the first R-value;

the second foam layer having an open-cell structure; and the second foam layer has a second density less than the first density; and a third foam layer coupled to the second foam layer, wherein:

the third foam layer has a third density less than the second density;

the first foam layer, second foam layer, and third foam layer are coupled together free of an intervening layer;

the first and second foam layers comprise a similar material; and the first density, second density, and third density define a density gradient that at least partially provides an average sound absorption coefficient between 0.1 and 0.4 to the insulation component.

11. The insulation component of claim 10, wherein the insulation component includes the average sound absorption coefficient at a frequency range between 50 and 2,050 Hz.

12. The insulation component of claim 10, wherein the first foam layer includes a density between 1.4 and 1.9 pcf.

13. The insulation component of claim 10, wherein the second foam layer includes a density between 0.3 and 0.8 pcf.

14. The insulation component of claim 10, further comprising a facer layer coupled to either the first or second foam layers.

15. The insulation component of claim 14, wherein the facer layer includes a plurality of microparticles or perforations.

16. A wall system, comprising:

a wall; and the insulation component of claim 10.

17. A method comprising:

providing a first polyol;

adding a first isocyanate to the first polyol to form a first foam core, wherein the first foam core includes a first density and a first R-value between 4.5 and 8 per inch of thickness;

providing a second polyol;

adding a second isocyanate to the second polyol to form a second foam core, wherein:

the second foam core includes a second R-value less than the first R-value the second foam core has a second density less than the first density; and the first and second foam cores comprise a similar material; and coupling the first foam core to the second foam core; and coupling a third foam core to the second foam core together to form an insulation component, wherein:

the third foam core has a third density less than the second density;

the first foam core, second foam core, and third foam core are coupled together free of an intervening layer; and the first density, second density, and third density define a density gradient that at least partially provides an average sound absorption coefficient between 0.1 and 0.4 to the insulation component.

18. The method of claim 17, wherein the insulation component includes the average sound absorption coefficient at a frequency range between 50 and 2,050 Hz.

19. The insulation component of claim 17, wherein the first foam core includes a density between 1.4 and 1.9 pcf.

20. The insulation component of claim 17, wherein the second foam core includes a density between 0.3 and 0.8 pcf.

* * * * *